United States Patent [19]
> Rubio

[11] 3,709,696
[45] Jan. 9, 1973

[54] TORTILLA AND PROCESS USING HYDROPHILIC INORGANIC GELS

[75] Inventor: Manuel J. Rubio, Bridgeport, Conn.

[73] Assignee: Roberto Gonzalez Barrera, Monterrey, N.L., Mexico

[22] Filed: May 6, 1971

[21] Appl. No.: 141,045

Related U.S. Application Data

[63] Continuation-in-part of Ser. No. 44,584, June 8, 1970, abandoned.

[52] U.S. Cl. .................................................99/80 R
[51] Int. Cl. .................................................A21d 2/18
[58] Field of Search ...........................................99/80

[56] References Cited

UNITED STATES PATENTS

| | | | |
|---|---|---|---|
| 2,002,053 | 5/1935 | Doolin | 99/80 |
| 2,509,927 | 5/1950 | Johnston | 99/81 |
| 2,584,893 | 2/1952 | Lloyd et al. | 99/93 |
| 3,369,908 | 2/1968 | Gonzalez et al. | 99/93 |

*Primary Examiner*—Raymond N. Jones
*Attorney*—Jackson, Jackson & Chovanes

[57] ABSTRACT

To retard the staling of tortillas, which are an unleavened unshortened food product made from nixtamalized corn or corn flour to retard microbiological spoilage, and to increase the yield of dough and tortillas by incorporating hydrophilic inorganic gels in making the tortilla dough.

9 Claims, No Drawings

TORTILLA AND PROCESS USING HYDROPHILIC INORGANIC GELS

This application is a continuation-in-part of my application Ser. No. 44,584, filed June 8, 1970, now abandoned for TORTILLA AND PROCESS USING HYDROPHILIC INORGANIC GELS.

The present invention relates to retarding the staling of tortillas to retard microbiological spoilage, and increasing the yield of tortilla dough and tortillas.

Many expedients which apply for preventing staling and preventing microbiological spoilage to the usual wheat, whole wheat or rye bread, commonly eaten, are not effective when applied to tortillas, because of the marked differences in their composition from the breads mentioned above. Among these differences are:

1. Tortillas are made from whole corn, that is corn which contains its germ, hull, bran, etc. Bread is made from dehulled, degermed and debranned wheat.
2. Dehulled, degermed, debranned wheat used in making bread undergoes no chemical treatment before grinding. Whole corn used in making tortillas always undergoes the chemical treatment of steeping in limewater at pH 12 before grinding.
3. Dehulled, degermed, debranned wheat used in making bread is ground into a flour in the dry state. Steeped whole corn used in making tortillas is ground into a dough in the wet state, after which the dough is either dried into a flour or used directly to make tortillas.
4. The dough used for making bread is always prepared from dry dehulled, degermed, debranned wheat flour. The dough used for making tortillas may be prepared either from dry limed whole corn flour or directly by grinding whole corn steeped in limewater at pH 12.
5. In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.
6. The final moisture content of bread after baking is approximately 20 percent; that of tortillas after cooking is approximately 45 percent. Due to its lower moisture content, bread is much less subject to microbial spoilage than tortillas.
7. Bread is baked inside an oven by hot air at a temperature of 425° – 500° F. for 30 to 60 minutes. Tortillas are cooked on a hot plate at 290° – 410° F., each side or face being exposed alternately to the heat for 15 to 20 seconds, after which the first side is again exposed for an additional 15 to 20 seconds.
8. Other differences between bread and tortillas are the following:
    a. Dehulled, degermed, debranned wheat flour used in breadmaking is usually bleached; limed corn flour used for making tortillas is never bleached.
    b. Bread is usually leavened; tortillas are never leavened.
    c. Bread is always baked in the shape of loaves or rolls; tortillas are always shaped in the form of round, flat discs.
    d. The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below:

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290°–410°F. In the cooking process, each face or side of the disc is alternately exposed to the heat for 15 to 20 seconds, after which the first side is again exposed for an additional 15 to 20 seconds.

The cooked discs or tortillas have a moisture content of 40 – 48 percent and are ready to eat.

Limed corn dough may be prepared from limed corn flour of size smaller than 45 U.S. Standard Mesh, 8 – 12 percent moisture content and pH 6–7. The dough is made by mixing 1.0 – 1.4 pounds of tap water per pound of flour.

Limed corn dough may also be made directly by grinding corn which has been steeped in limewater. In such case 1 pound of corn is steeped overnight in 0.5 – 0.8 pounds of water, initially at boiling temperature, which contains 0.5 – 1.5 percent calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12 to 15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after 24 hours, marked after 48 hours and almost complete after 72 hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

TABLE 1

Variation of the Flexibility Index of Tortillas with Time at Room Temperature

| Flexibility index after the following elapsed time | | | | |
|---|---|---|---|---|
| 0 hr | 24 hr | 48 hr | 72 hr | 96 hr |
| 8.5 | 7.7 | 6.5 | 6.0 | 5.5 |

Table 1 gives typical values for variation of the flexibility index of tortillas with time at room temperature.

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention tortillas stored under conditions in which no moisture is lost from them become stale more slowly because of the additive of the invention, which retards hardening with time, regards loss of flexibility with time, increases the freshness of the tortillas, prolongs the flexible shelf life of the tortillas and increases the freshness of both freshly made tortillas and also reheated tortillas.

RETARDING MICROBIOLOGICAL SPOILAGE

The present invention prolongs the shelf life, retards microbiological spoilage and increases the resistance to microbiological spoilage of tortillas and of tortilla dough.

Limed corn dough and tortillas made therefrom are very susceptible from attack and spoilage by bacteria, yeasts, molds and other microorganisms, and they are therefore susceptible to such spoilage.

Typical moisture contents of dough and tortillas and typical shelf lives are given in the table below:

TABLE 2

Typical Moisture Contents and Shelf Lives at 25°C for Limed Corn Dough and Tortillas Without Additives of Any Kind

| Product | Moisture Content | Shelf Life at 25°C. |
|---|---|---|
| Dough | 55–60% | 6 hours |
| Tortillas | 42–48% | 12 hours |

The shelf life is the time required to detect unmistakable signs of bacterial spoilage in the product. These signs include production of off-flavors and odors, production of "rope" (a polysaccharide resulting from the growth of certain bacteria such as B.mesentericus) and appearance of moldy spots. Obviously, the shelf life of a product depends upon the temperature at which it is stored, as higher temperatures, normally produce lower shelf life and vice versa. Also, the type of spoilage which first occurs depends on the temperature. In the limed corn dough and tortillas the first sign of spoilage at higher temperatures (above 30°C.) are usually off-flavors due to the growth of bacteria, while below 30°C. the first signs are usually moldy spots. Table 3 gives typical shelf life of limed corn dough and tortillas at different temperatures.

TABLE 3

Typical Shelf Lives of Limed Corn Dough And Tortillas At Different Temperatures

| Product | Storage Temperature | Shelf Life |
|---|---|---|
| Dough | 37°C | 3 hours |
| | 25°C | 6 hours |
| | 15°C | 12 hours |
| Tortillas | 37°C | 6 hours |
| | 25°C | 12 hours |
| | 15°C | 18 hours |

The present invention is in the nature of an enhancer preventing spoilage when used with another agent.

YIELD

It has been known that the yields of tortillas depend upon the ability of the dough or of the tortillas to retain water. The additive of the invention increases the water-binding ability of the dough and of the tortilla.

When tortilla dough is prepared from limed corn or limed corn flour, it has a certain consistency. When an additive of the invention is mixed with the dough, unless more water is added, the dough becomes stiffer and in order to obtain the consistency of tortilla dough without the additive, it is necessary to add more water to the dough. Thus, the yield of dough obtained per unit weight of limed corn or limed corn flour is increased. In the case of tortilla dough and tortillas the yield is the number of kilos of dough per kilo of corn, or the number of kilos of tortillas per kilo of corn, or the number of kilos of dough per kilo of limed corn flour or the number of kilos of tortillas per kilo of limed corn flour.

Similarly, when tortillas are prepared from ordinary limed corn dough, a certain amount of water is lost when they are cooked. If, however, tortillas are prepared from limed corn dough which contains the additive of the invention, an amount of water which is less than that from ordinary dough will be lost from the tortillas when they are cooked. The result is that the yield of tortillas obtained per unit weight of limed corn or limed corn flour will be increased.

Thus, in this aspect of the invention, the additive increases the yield of dough made from limed corn or limed corn flour and increases the yield of tortillas made from limed corn or limed corn flour.

Introducing the Additive into the Dough

The additive may be introduced into the dough in any of several different ways. It may be added to the dough as an aqueous suspension or dispersion which is thoroughly mixed in the dough to form a uniform distribution of the additive. Since this involves the addition of water to the dough, allowance must be made for the water incorporated with the additive, and compensation may be required in respect to the quantity of other water added. If the dough is made from limed corn flour, the additive may be dispersed or suspended in the water which is subsequently to be mixed with the flour in order to make the dough. It will be understood that where the additive acts to increase the yield, the total amount of water used to make the dough of a certain consistency is greater than if the additive was not employed.

In some cases it is preferred to mix the aqueous dispersion or suspension of the additive with the dry limed corn flour prior to mixing the flour with the water.

Hydrophilic Inorganic Gels

The additive used in the present invention is an edible hydrophilic inorganic gel such as aluminum hydroxide gel or ferric hydroxide gel. Hydrophilic inorganic gels may be added in concentrations between 0.25 and 5 percent, preferably between 0.25 and 2 percent, of the weight of the tortillas. Hydrophilic inorganic edible gels retain a large amount of water in the tortillas and in the dough. They thus greatly aid in preventing staling and keep the tortillas much more flexible after a period of time in storage under conditions at which no moisture is lost.

Table 2 shows typical values for the flexibility of tortillas after different times at room temperature with different additions of aluminum hydroxide gel. It will be noted that the flexibility is markedly increased by increasing additions of the additive.

TABLE 4

Typical Values of Flexibility Index
at Room Temperature of
Tortillas Obtained with Use of
Wet, Freshly-prepared
Aluminum Hydroxide Gel

| Dose of aluminum hydroxide gel based on weight of tortillas | Flexibility index after | | | | |
|---|---|---|---|---|---|
| | 0 hr | 24 hr | 48 hr | 72 hr | 96 hr |
| 0.0% (Control) | 8.5 | 7.7 | 6.5 | 6.3 | 6.0 |
| 0.5% | 8.8 | 8.3 | 8.0 | 7.8 | 7.5 |
| 1.0% | 9.3 | 8.8 | 8.6 | 8.3 | 8.0 |
| 2.0% | 9.8 | 9.3 | 9.0 | 8.7 | 8.5 |

Aluminum hydroxide gel has been found to be one of the most effective agents for retaining the flexibility of tortillas during storage.

Aluminum hydroxide gel also greatly promotes the yield of tortillas as shown in Table 5. Both the dough and the tortilla yields were increased markedly as the doses of additive were increased where the tortillas were made from limed corn flour.

TABLE 5

Typical Values of Dough and
Tortilla Yields Obtained from
Limed Corn Flour Using Wet
Aluminum Hydroxide Gel,
Freshly Prepared

| Dose of aluminum hydroxide gel based on weight of tortillas | Yield of dough, kilos per kilo of flour | Yield of tortillas, kilos per kilo of flour |
|---|---|---|
| 0.0% (Control) | 2.258 | 1.753 |
| 0.5% | 2.314 | 1.803 |
| 1.0% | 2.377 | 1.842 |
| 2.0% | 2.472 | 1.924 |

Drying of hydrophilic inorganic gels such as aluminum hydroxide gel reduces their water-binding capacity considerably so that they lose most of their effectiveness. For this reason the gels must be freshly prepared at the time they are inserted in the tortillas and must be retained wet.

Since the aluminum hydroxide gel contains an appreciable amount of water, the presence of this water must be considered and compensated for in preparation of the dough.

The aluminum hydroxide will be used with any one of the additives to prevent microbiological spoilage which are covered in co-pending applications Ser. Nos. 58,138, filed July 24, 1970 for TORTILLA AND PROCESS USING ACETIC AND PROPIONIC ACIDS; 58,139, filed July 24, 1970 for TORTILLA AND PROCESS USING POLYCARBOXYLIC ACIDS AND THEIR ANHYDRIDES; 58,141, filed July 24, 1970, now abandoned, for TORTILLA AND PROCESS USING WATER SOLUBLE ALKALINE SUBSTANCE; 58,143, filed July 24, 1970 for TORTILLA AND PROCESS USING SORBIC ACID AND ITS SALTS; 58,144, filed July 24, 1970 for TORTILLA AND PROCESS USING METHYL, ETHYL, BUTYL, AND PROPYL ESTERS OF PARA-HYDROXYBENZOIC ACID; 58,653, filed July 27, 1970 for TORTILLA AND PROCESS USING DEHYDROACETIC ACID; 58,655, filed July 27, 1970, now abandoned, for TORTILLA AND PROCESS USING ALKALIZING SUBSTANCES which include propionic acid and its sodium or calcium salts, sodium diacetate, sorbic acid and its sodium and potassium salts, methyl, ethyl and propyl esters of para-hydroxybenzoic acid, dehydroacetic acid, and alkalizing substances, using 0.25 to 2 percent of the tortilla and a pH of 4 to 7 introduced by aluminum hydroxide gel with the other agents.

The other agents may be used in suitable concentrations as follows:

TABLE 6 a. Low molecular weight fatty acids including one to four carbon atoms and their anhydrides and water soluble salts including formic acid, propionic and butyric acids; sodium, potassium and calcium formates, acetates, propionates and butyrates and sodium, potassium and calcium diacetate in doses from 0.25 to 0.8 percent of the tortillas.

b. Benzoic acid and its soluble salts, including potassium and sodium benzoates in doses of 0.1 to 0.4 percent of the weight of the tortillas.

c. Esters of para-hydroxybenzoic acid, including the methyl, ethyl, propyl and butyl esters in doses of 0.1 to 0.4 percent of the weight of the tortillas.

d. Sorbic acid and its soluble salts such as sodium and potassium sorbates in doses of 0.1 to 0.5 percent of the weight of the tortillas.

e. Dehydroacetic acid and its soluble salts such as sodium and potassium dehydroacetate in doses of 0.35 to 0.8 percent of the weight of the tortillas.

Mixtures of two or more substances may be used with advantage.

EXAMPLE 1

Aluminum hydroxide gel is prepared by reacting 100 grams of sodium aluminate in a 3.33 percent solution with 50 grams of hydrochloric acid in a 20 percent solution and adjusting the final pH to a value of approximately 4. The gel, still wet, is separated from the supernatant liquid by filtration or decanting and kept wet until used in the tortillas. It is important that the final pH be on the acid side so that it will not affect the color of the tortillas. The pH range should be between 4 and 6. The pH should not be so acid that it will render the tortillas inedible.

EXAMPLE 2

As an alternate procedure for making aluminum hydroxide gel, 100 grams of aluminum chloride in a solution having a concentration of 3.33 percent by weight and 90 grams of sodium hydroxide in a solution of 20 percent by weight are reacted together throwing down aluminum hydroxide as a precipitate. The final pH is adjusted to a value of approximately 4, and the aluminum hydroxide gel is separated either by decantation or filtration and maintained wet continuously preparatory for use in the tortilla dough.

EXAMPLE 3

Nixtamalized corn flour is mixed with 140 percent on the dry weight of water including 1 percent of the dry weight of aluminum hydroxide gel freshly prepared and added with the water. The ingredients are mixed in with the water in a dough mixer until the mix is homogeneous and the dough is sold as dough in containers that prevent loss of moisture or cooked into tortillas at a temperature of about 290° to 410°F. at sea level.

EXAMPLE 4

Tortilla dough is mixed in a dough mixer by introducing nixtamalized corn flour in 100 percent of the weight of the dry ingredient of water and after the dough is completely homogenized, 1 percent of aluminum hydroxide gel in 40 percent of water, both of the weight of the flour, is added in the dough mixer and incorporated in the dough.

In Examples 3 and 4 the tortillas when stored under conditions in which loss of moisture is prevented, retain their flexibility unusually during storage as set forth in Table 2 and the yield is improved as set forth in Table 3.

As shown by the following table, ammonium hydroxide gel promotes the effectiveness of additives to control microbiological spoilage very effectively. The example is given of propionic acid as such an additive but similar results are obtained in the other additives referred to.

TABLE 7

Effect of Combinations of Propionic Acid and Aluminum Hydroxide Gel of pH 4 in Increasing the Shelf Life of Tortillas at 37°C

| Additive combination and dose | Shelf life, hours |
|---|---|
| 0.2% Propionic acid + 2% Aluminum Hydroxide | 84 |
| 0.4% Propionic Acid + 2% Aluminum Hydroxide | 192 |
| Control I, 0.2% Propionic Acid alone | 72 |
| Control II, 0.4% Propionic Acid alone | 144 |
| Control III, no additive | 6 |

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A tortilla essentially consisting of nixtamalized corn or nixtamalized corn flour and hydrophilic inorganic edible gel, the gel being introduced into the tortilla dough as freshly prepared wet gel in the proportion of from 0.25 to 5 percent of the dough.

2. A tortilla essentially consisting of nixtamalized corn or nixtamalized corn flour and edible aluminum hydroxide gel, the gel being introduced into the tortilla dough as freshly prepared wet gel in the proportions of from 0.25 to 5 percent of the weight.

3. A tortilla essentially consisting of nixtamalized corn or nixtamalized corn flour, edible aluminum hydroxide gel, the gel being introduced into the tortilla dough as freshly prepared wet gel in the proportions of 0.25 to 2 percent on the weight, and an effective quantity of an additive to prevent spoilage, having increased resistance to microbiological spoilage.

4. A tortilla dough essentially consisting of nixtamalized corn or nixtamalized corn flour and from 0.25 to 5 percent on the weight of the tortilla of freshly prepared wet hydrophilic inorganic edible gel.

5. A tortilla dough essentially consisting of nixtamalized corn or nixtamalized corn flour and from 0.25 to 5 percent on the weight of the tortilla of freshly prepared edible wet aluminum hydroxide gel.

6. A tortilla dough essentially consisting of nixtamalized corn or nixtamalized corn flour, 0.25 to 2 percent on the weight of the tortilla of freshly prepared edible wet aluminum hydroxide gel and an effective quantity of an additive to prevent microbiological spoilage.

7. A process of making tortilla dough which produces tortillas of increased resistance to loss in flexibility when stored under conditions of constant moisture content and having increased yield, which comprises mixing nixtamalized corn or nixtamalized corn flour with water to make tortilla dough and incorporating in the dough from 0.25 to 5 percent by weight of the tortilla of freshly prepared hydrophilic inorganic edible gel in moist condition.

8. A process of claim 7, in which the gel consists of aluminum hydroxide gel.

9. The process of making tortilla dough which produces tortillas of increased resistance to microbiological spoilage, which comprises mixing nixtamalized corn or nixtamalized corn flour with water to make tortilla dough, incorporating in the dough an agent which retards micribiological spoilage and incorporating in the dough from 0.25 to 5 percent by weight of the tortilla of freshly prepared hydrophilic inorganic edible gel in moist condition.

* * * * *